United States Patent [19]

Salvatore

[11] Patent Number: 5,012,992
[45] Date of Patent: May 7, 1991

[54] SPIN STABILIZATION VIA MOMENTUM WHEELS OR SIMILAR DEVICES

[75] Inventor: Jeremiah O. Salvatore, Redondo Beach, Calif.

[73] Assignee: Hughes Aircraft Company, Los Angeles, Calif.

[21] Appl. No.: 282,418

[22] Filed: Dec. 9, 1988

[51] Int. Cl.$^5$ .............................................. F42B 10/02
[52] U.S. Cl. ................................... 244/3.23; 244/165
[58] Field of Search ................... 244/3.21, 3.23, 3.29, 244/164, 165

[56] References Cited

U.S. PATENT DOCUMENTS

| | | | |
|---|---|---|---|
| 3,111,290 | 11/1963 | Knowles | 244/165 |
| 3,424,401 | 1/1969 | Maurer | 244/165 |
| 3,940,096 | 2/1976 | Keigler et al. | 244/165 |
| 4,114,841 | 9/1978 | Muhlfelder et al. | 244/166 |
| 4,230,294 | 10/1980 | Pistiner | 244/170 |
| 4,275,861 | 6/1981 | Hubert | 244/165 |
| 4,288,051 | 9/1981 | Goschel | 244/164 |
| 4,657,210 | 4/1987 | Hubert et al. | 244/158 R |

Primary Examiner—Charles T. Jordan
Assistant Examiner—Richard W. Wendtland
Attorney, Agent, or Firm—Robert A. Westerlund; Steven M. Mitchell; Wanda K. Denson-Low

[57] ABSTRACT

A spacecraft incorporating momentum sources such as spinning momentum wheels having momentum vectors or components thereof oriented along the desired axis of rotation of the spacecraft. The rotation axis of the spacecraft is nominally any one of the three principal moment of inertia axes of the body. Proper adjustment of the spin rate of the main body relative to the magnitude of the moment sources angular momentum will insure that the spacecraft will spin about the desired axis in a passively stable way even though the rotational axis is not the principal axis of maximum moment of inertia.

9 Claims, 1 Drawing Sheet

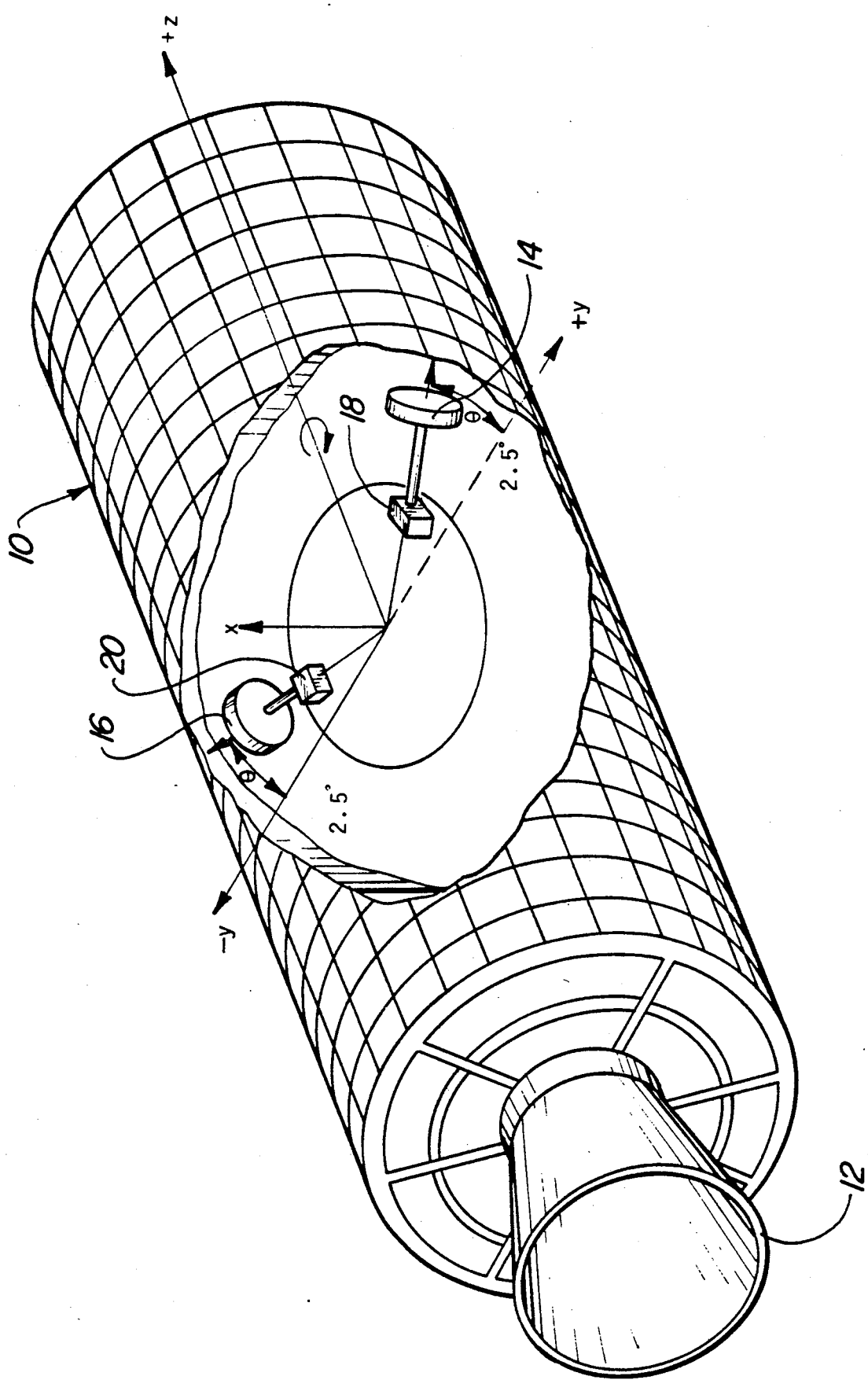

SPIN STABILIZATION VIA MOMENTUM WHEELS OR SIMILAR DEVICES

BACKGROUND OF THE INVENTION

1. Field of the Invention

This invention relates to a system for stabilizing a spinning spacecraft exposed to destabilizing moments and/or possessing unfavorable mass properties.

2. Description of Related Art

Spin stabilization is the simplest technique for controlling spacecraft attitude for orbiting spacecraft during the launch and orbit injection phases, and the on-station orbiting phase. A spacecraft (or any other generally rigid body) can be characterized as having three principal moment of inertia axes which typically each have a unique moment of inertia value, thus defining a maximum axis, a minimum axis, and an intermediate axis. A continuing problem in spacecraft design is to insure spacecraft stability during rotation. In order to provide stability, spacecraft are spun about either a maximum principal axis which is preferred because it is passively stable, or their minimum principal axis, which provides stability if used with active nutation control systems. Rotation about the intermediate axis is inherently unstable and requires a continuous active thruster control system. Since design constraints in spacecraft design often result in spin being preferred about the intermediate or minimum axes, some form of nutation control system is ordinarily required Such systems, however, add complexity, cost and weight to the spacecraft.

In view of the foregoing, there is a need to provide a simplified spacecraft stabilization system permitting rotation about moment of inertia axes other than the maximum moment of inertia axis in a passively stable manner.

SUMMARY OF THE INVENTION

In accordance with the present invention, the total angular momentum vector (or a component thereof) of one or more spinning wheels carried by the spacecraft is oriented along the desired rotation axis of the spacecraft. The rotational axis of the spacecraft is nominally any one of the three principal axes. Proper adjustment of the spin rate of the spacecraft relative to the magnitude of the wheels angular momentum insures that the spacecraft will spin about the desired axis in a passively stable way, even though the rotation axis of the spacecraft is not the principal axis of maximum moment of inertia. This invention allows an active spacecraft to spin about any principal axis without requiring sophisticated nutation control systems while alleviating tight design constraints and mass property uncertainty.

BRIEF DESCRIPTION OF THE DRAWING

In the accompany drawing:

FIG. 1 is a pictorial view of a spacecraft including a pair of momentum wheels operating in accordance with this invention to provide passive spacecraft stability.

DESCRIPTION OF THE PREFERRED EMBODIMENT

The physical elements of the system according to the present invention will be described with reference to the figure, which is followed by a description of the theory of operation of the system. FIG. 1 illustrates a representative spacecraft 10 which is cylindrical in shape and has a main thruster 12. Three reference orthogonal axes are oriented with respect to spacecraft 10 such that the spacecraft is rotating about the z axis. A pair of momentum wheels 14 and 16 are provided which are oriented at an angle (theta) from the y axis. Suitable momentum wheel drive means 18 and 20 are provided for rotating the momentum wheels in a desired direction and speed.

The angle $\theta$ is selected to provide a desired component of angular momentum, $h_\omega$, along the spacecraft spin axis as required by the theory in Equations (1)–(8) below.

The theory of operation of the system according to this invention will now be described. A single rigid spinning body can be characterized by three principal moments of inertia axes $I_x$, $I_y$, $I_z$. Assuming the body is spinning about the z axis at a rate $\omega_z$, it can be shown that the rotation is stable if the following inequality is satisfied:

$$(I_z - I_x)(I_z - I_y)\omega_z^2 > 0 \qquad (1)$$

Note that rotation about the z axis is stable when it is an axis of maximum or minimum moment of inertia, and unstable when it is an axis of intermediate moment of inertia. Defining $\sigma_x = I_z/I_x$, and $\sigma_y = I_z/I_y$, the condition for rigid body stability can be expressed as:

$$\sigma_x > 1 \text{ and } \sigma_y > 1 \text{ or } \sigma_x < 1 \text{ and } \sigma_y < 1 \qquad (2)$$

It can be shown for a "quasi" rigid body such as spacecraft 10 (where energy dissipation occurs and damping is present), that the only stable rotation is when the z axis is an axis of maximum moment of inertia, or:

$$\sigma_x > 1, \sigma_y > 1 \qquad (3)$$

This is the state corresponding to minimum rotational energy. Defining the "equivalent roll-to-pitch ratio" for an asymmetric body to be $\sigma_e$, then:

$$(\sigma_e - 1)^2 = (\sigma_x - 1)(\sigma_y - 1) \qquad (4)$$

We identify the familiar stability criterion that the "roll-to-pitch" ratio must be greater than 1 for passive stability.

This stability criterion changes significantly if one allows an additional source of momentum on the desired axis of rotation such as provided by momentum wheels 14 and 16. For example, assuming a wheel or combination of wheels providing a component of angular momentum, $h_\omega$, parallel to the z axis, it can be shown that the rotation is stable if the following inequality is satisfied:

$$[(I_z - I_x)\omega_z + h_\omega][(I_z - I_y)\omega_z + h_\omega] > 0 \qquad (5)$$

If one identifies the total spin momentum $h_s$ as:

$$h_s = I_z\omega_z + h_\omega \qquad (6)$$

and generalizes the inertia ratios $\sigma_x$ and $\sigma_y$ to be:

$$\sigma_x = \frac{h_s}{I_x\omega_z}, \quad \sigma_y = \frac{h_s}{I_y\omega_z} \qquad (7)$$

Then Equation (5) implies that a quasi rigid body such as spacecraft 10 with an additional momentum source can have a stable rotation about the z axis which is not required to be the axis of maximum moment of inertia if $\sigma_x>1$ and $\sigma_y>1$. Adjustment of the spin rate of the main body together with the momentum of the additional source can compensate for adverse mass properties and insure stable rotation about the desired axis.

In a specific example of an embodiment of the present invention, a pair of momentum wheels 14 and 16 are oriented with an angle (theta) of 2.5 degrees from the y axis toward the z axis (i.e., 87.5 degrees from the z axis). This value was used since a design of applicant's satellite was capable of angular adjustment of its momentum wheels to this value. Other values for angle theta could be used with equal success and are within the scope of this invention. In order to obtain the desired momentum source along the spin axis, wheels 14 and 16 were spun in opposite directions at their maximum speed. The moment capabilities of wheels 14 and 16 are chosen using the relationship given by:

$$\Delta I = \frac{h_\omega}{\omega_z}, \quad (8)$$

where $\Delta I$ is the effective increase in spacecraft spin moment-of-inertia required to achieve stable spin about the z-axis. Since momentum wheels 14 and 16 combine to provide an appropriate angular momentum vector component, $h_\omega$, in the direction of desired rotation of spacecraft 10, they insure that the spacecraft will spin about the desired axis in a passively stable mode. This rotational axis of the spacecraft 10 can be any principal axis of intermediate or minimum moment of inertia but will behave as if it were a principal axis of maximum moment of inertia.

Orientation of sufficiently large angular momentum vectors of momentum wheels 14 and 16 in directions opposite the direction of desired rotational axis of the spacecraft can insure that the spacecraft will spin about the desired axis in an actively stable mode. In other words, the rotational axis of the spacecraft can be a principal axis of maximum or intermediate moment of inertia but can be made to behave as if it were a principal axis of minimum moment of inertia. This application could be useful if the desired rotation axis of spacecraft 10 tends to be an axis of minimum moment of inertia but it would be simpler to insure it always remains a minimum axis and employ active nutation control.

While the above description constitutes an embodiment of the present invention, it will be appreciated that the invention is susceptible of modification, variation and change without departing from the proper scope and fair meaning of the accompanying claims. For example, the addition of on-board sensing, software, closed loop control, autonomous or automatic operation, etc. does not change or detract from the basic scope or meaning of this invention.

What is claimed is:

1. A stabilization system for a spinning spacecraft having three mutually perpendicular principal axes, defined as x, y and z axes, with the spacecraft spinning about the z-axis, the stabilization system including:
   a pair of rotatable momentum wheels carried by the spacecraft, each of said wheels having an axis of rotation oriented at an angle with respect to the z-axis on opposite sides of the x-axis in a common plane which includes both the z and y axes;
   means for rotating said wheels in respectively opposite directions but at the same speed, whereby components of angular momentum thereby generated by said wheels along the y-axis are annulingly subtractive, and components of angular momentum thereby generated by said wheels along the z-axis are additive, thereby providing additional angular momentum along the z-axis, wherein the magnitude of said additional momentum is to stabilize the spacecraft about the z-axis.

2. The system as set forth in claim 1, wherein the z-axis is the principal axis of intermediate moment of inertia.

3. The system as set forth in claim 1, wherein the z-axis is the principal axis of minimum moment of inertia.

4. The system as set forth in claim 1, wherein the z-axis is the principal axis of maximum moment of inertia.

5. The system as set forth in claim 1, wherein the direction and magnitude of said additional angular momentum are appropriate for stabilizing the spin of the spacecraft about the z-axis in a passively stable mode.

6. The system as set forth in claim 1, wherein the direction and magnitude of said additional angular momentum are appropriate for stabilizing the spin of the spacecraft about the z-axis in an actively stable mode.

7. The system as set forth in claim 1, further including means for adjusting the rate of spin of the spacecraft about the z-axis relative to the magnitude of said additional angular momentum, wherein the adjusted spin rate and said additional angular momentum cooperate to stabilize the spin of the spacecraft about the z-axis.

8. A method for stabilizing a spacecraft having an intermediate moment of inertia axis, defined as a z-axis, including the steps of:
   spinning the spacecraft about the z-axis, thereby generating a first component of angular momentum along the z-axis;
   generating a second component of angular momentum along the z-axis to thereby impart a total angular momentum along the z-axis equal to the sum of said first and second components of angular momentum; and,
   wherein said second component of angular momentum is pre-selected to render said total angular momentum sufficient to cause the z-axis to behave as though it were a maximum moment of inertia axis.

9. A method for stabilizing a spacecraft having a minimum moment of inertia axis, defined as a z-axis, including the steps of:
   spinning the spacecraft about the z-axis, thereby generating a first component of angular momentum along the z-axis;
   generating a second component of angular momentum along the z-axis, to thereby produce a total angular momentum along the z-axis equal to the sum of said first and second components of angular momentum; and,
   wherein said second component of angular momentum is pre-selected to render said total angular momentum sufficient to cause the z-axis to behave as though it were a maximum moment of inertia axis.

* * * * *

UNITED STATES PATENT AND TRADEMARK OFFICE
CERTIFICATE OF CORRECTION

PATENT NO. : 5,012,992

DATED : May 7, 1991

INVENTOR(S) : Jeremiah O. Salvatore

It is certified that error appears in the above-identified patent and that said Letters Patent is hereby corrected as shown below:

Column 4, line 9, after the word "additional", please insert the word --angular--.

Column 4, line 9, after the word "is", please insert the word --sufficient--.

Signed and Sealed this

Twentieth Day of October, 1992

Attest:

DOUGLAS B. COMER

*Attesting Officer*  *Acting Commissioner of Patents and Trademarks*